UNITED STATES PATENT OFFICE.

JAMES C. LEWIS, OF BELFAST, MAINE.

IMPROVED COMPOUND FOR TREATING ASTHMA AND OTHER DISEASES.

Specification forming part of Letters Patent No. 90,179, dated May 18, 1869.

*To all whom it may concern:*

Be it known that I, JAMES C. LEWIS, of Belfast, in the county of Waldo and State of Maine, have invented a new and original Medicine for the Relief and Cure of Phthisic, Asthma, and other kindred diseases, to be called and known by the name of "Lewis's Inhalant for Phthisic;" and I do declare that the following is a full and exact description thereof.

The ingredients, proportions thereof, and mode of preparation of my invention are as follows: To one (1) gallon of pure spring-water I add as much saltpeter as can be dissolved in the water. To this I add four (4) ounces ethereal tincture of lobelia, four (4) ounces tincture of asafetida, two (2) ounces laudanum, and four (4) ounces iodide of potassium.

In the liquid formed of the above ingredients I steep stramonium-leaves until they become thoroughly saturated by the liquid. The stramonium leaves are then taken from the liquid, dried, and ground, and are then ready for use.

The medicine is administered to the patient by being burned and the smoke inhaled.

*Claim.*

What I claim as my invention, and desire to secure by Letters Patent, is—

The compounding of the above ingredients, and their preparation, as herein set forth.

JAMES C. LEWIS.

Witnesses:
WM. H. FOGLER,
CHARLES W. ARNOLD.